(12) United States Patent
Adcock

(10) Patent No.: US 6,193,596 B1
(45) Date of Patent: Feb. 27, 2001

(54) POSITIONING BIVALVE SHELLFISH FOR PROCESSING

(75) Inventor: John Trevor Adcock, Noble Park (AU)

(73) Assignee: Sasakat Pty Ltd, Victoria (AU)

( * ) Notice: Subject to any disclaimer, the term of this patent is extended or adjusted under 35 U.S.C. 154(b) by 0 days.

(21) Appl. No.: 09/445,248

(22) PCT Filed: Jun. 9, 1998

(86) PCT No.: PCT/AU98/00436

§ 371 Date: Dec. 3, 1999

§ 102(e) Date: Dec. 3, 1999

(87) PCT Pub. No.: WO98/54976

PCT Pub. Date: Dec. 10, 1998

(30) Foreign Application Priority Data

Jun. 6, 1997 (AU) .................................................. P07248

(51) Int. Cl.$^7$ .................................................. A22C 29/04
(52) U.S. Cl. .............................. 452/180; 452/179; 452/12
(58) Field of Search .................................. 452/180, 179, 452/12, 18, 185

(56) References Cited

U.S. PATENT DOCUMENTS

| | | |
|---|---|---|
| 1,333,843 | 3/1920 | Torsch et al. . |
| 3,828,398 * | 8/1974 | Harris et al. ............................ 452/18 |
| 4,663,805 * | 5/1987 | Adcock .................................. 452/18 |
| 5,427,567 | 6/1995 | Adcock .................................. 452/13 |
| 5,823,864 * | 10/1998 | Watanabe .............................. 452/182 |

FOREIGN PATENT DOCUMENTS

89/00010    1/1989 (AU) .

OTHER PUBLICATIONS

Patent Abstract of Japan, JP 9–234642A Sep. 9, 1997, Towa Denki.
Seisakusho;KK..
Patent Abstracts of Japan, C–889, p. 68, JP3–201935(A) Sep. 3, 1991, Susumu Ebisaki.

* cited by examiner

*Primary Examiner*—Willis Little
(74) *Attorney, Agent, or Firm*—Flanagan & Flanagan; John R. Flanagan; John K. Flanagan

(57) ABSTRACT

Apparatus for determining the position of a bivalve shellfish (10), particularly a scallop, which is to be processed to recover an edible portion. A shell shape complement (30) has at least a partially complementary shape such as a concavity or recess to fit with at least a part of the shape or profile of the shellfish (10) such as the projecting part (18) at the hinge region (11). Moving means (40) rotates the shellfish relative to the shell shape complement (30) while the shellfish is maintained in contact with the shell shape complement (30) by biasing means operative to bias the shell shape complement (30) against the circumference (15) of the shellfish as the shellfish is rotated by the moving means (40) until a fit of the shellfish (10) with the complement is achieved. A sensor (45) is located within the concavity to sense and signal the achievement of the fit.

16 Claims, 3 Drawing Sheets

POSITIONING BIVALVE SHELLFISH FOR PROCESSING

Figure 1:
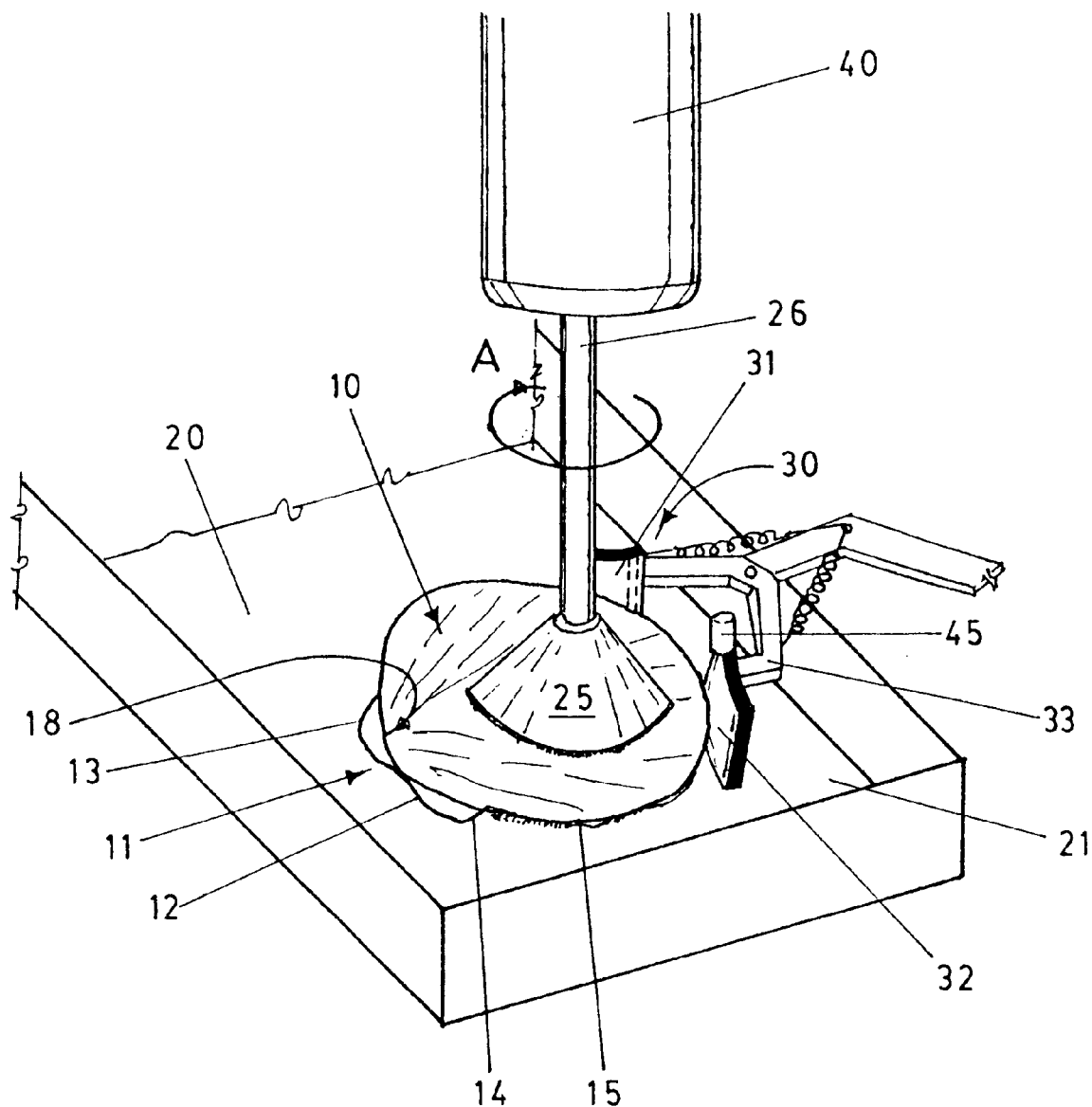

This invention relates to determining the positions of bivalve shellfish so that the shellfish can be located or positioned as part of a mechanised or automated shellfish processing apparatus.

In patent specification No. AU-19296/92 there is described an apparatus for processing bivalve shellfish, particularly scallops, in which there is an access forming means to part the two valves or shells sufficiently to leave a gap into which detaching means is inserted to detach the edible portion from both of the valves. In the preferred embodiment, the detaching means comprises two flexible blades which simultaneously follow the inside surfaces of the valves so as to simultaneously detach the edible portion from both of the shells, the two blades then grasping the edible portion and withdrawing it from the space between the two valves.

In this known apparatus, it is desirable to locate the shellfish so that it is held in a known position when the valves are parted to enable insertion of the blades. Since the blades are inserted mechanically and automatically, the best performance of the blades in cutting the edible portion from the inside surfaces of the two valves is achieved if each scallop is held in substantially the same position for the shell parting and blade insertion operations. This can be achieved for example by manually locating successive scallops in the same orientation as they are being fed to the shell parting and blade insertion station.

It is an object of the present invention to provide an apparatus for automatically determining the position of a bivalve shellfish for enabling subsequently processing to recover the edible portion.

According to the present invention there is provided an apparatus for determining the position of a bivalve shellfish which is received by the apparatus and which is to be subsequently processed to recover an edible portion of the shellfish, the apparatus including a shell shape complement having at least a partially complementary shape to at least a part of the conformation of the shellfish, and moving means for relatively moving the shellfish relative to the shell shape complement until a fit of the shellfish with the complement is achieved whereby the position of the shellfish relative to the complement can be known.

In the preferred embodiment, the shell shape complement comprises a means which has a shape complementary to a distinctive part of the contour or profile of the shellfish and which is unlikely to be replicated by another part of the contour or profile of the shellfish even if deformed or damaged. Preferably, the distinctive part of the contour or profile of the shellfish comprises a projecting part of the contour or profile and, in this case, the shell shape complement comprises a concavity of generally complementary shape to the projecting part.

In the case where the shellfish comprises a scallop, the projecting part comprises the hinge region of the shell which is defined by two stepped shoulders which step out from the generally continuously curved circumference and which are joined by an approximately straight line segment along which the two valves of the shellfish hinge. Preferably, the shell shape complement comprises a pair of curved guides spaced apart by a predetermined distance to define the concavity into which the hinge region of the scallop fits. In this embodiment, the apparatus preferably further includes a sensor for sensing achievement of the fit of the hinge region of the scallop with the shell shape complement comprised by the pair of curved guides, the sensor being located within the concavity between the curved guides at a depth so that the sensor will only be operative to sense the achievement of the fit when the hinge region has fitted between the pair of spaced curved guides. The sensor may be located closely adjacent to one of the curved guides and may be recessed at a predetermined distance into the concavity between the guides so that the sensor will sense the presence of the stepped shoulder area at the corner of the hinge region of the scallop but will not sense the scallop shell when it is in contact with the guides but is not in the fitting position.

In each embodiment, preferably the apparatus further includes a sensor for sensing achievement of a fit the part of the conformation of the shellfish with the shell shape complement whereby further processing of the shellfish can be initiated in response to sensing of the fit by the sensor. The sensor may comprise an opto-electrical device operative to optically sense the achievement of the fit and to signal the fit to initiate further processing of the shellfish. Alternatively, the sensor may comprise an electro-mechanical device such as a micro-switch, which is operated upon achievement of the fit to initiate further processing of the shellfish. As a further alternative the sensor may be a mechanical sensor which, upon achievement of the fit, trips or triggers initiation of further processing Preferably, the moving means for moving the shellfish relative to the shell shape complement comprises means for rotating the shellfish relative to the complement until a fit of the part of the confirmation of the shellfish with the shell shape complement is achieved. Preferably, the moving means is operative to rotate the shellfish while the shellfish is maintained in contact with the shell shape complement. The shell shape complement and the rotating shellfish may be maintained in contact by biasing means operative to bias the shell shape complement against the circumference of the shellfish as the shellfish is rotated by the moving means. Preferably, the shell shape complement is mounted for yielding or floating movement so as to follow the contour of the circumference of the shellfish as the shellfish is rotated and so that when the desired fit of said part of the confirmation of the shellfish with the shell shape complement is being closely approached the shell shape complement is urged into the fitting position.

In the particular embodiment in which the shellfish comprises a scallop, the apparatus preferably includes a mounting means such as a suction head which engages with an outer face of one of the valves of the scallop so as to hold the scallop, the drive means being operatively associated with the suction head so as to rotate the scallop generally about the centre of the suction head. Preferably, the suction head is arranged to be engaged with the outer face of one of the valves of the scallop in the approximate centre of the valve so that the scallop is rotated about an axis passing through the centre and at right angles to the general plane of the scallop.

Figure 2:
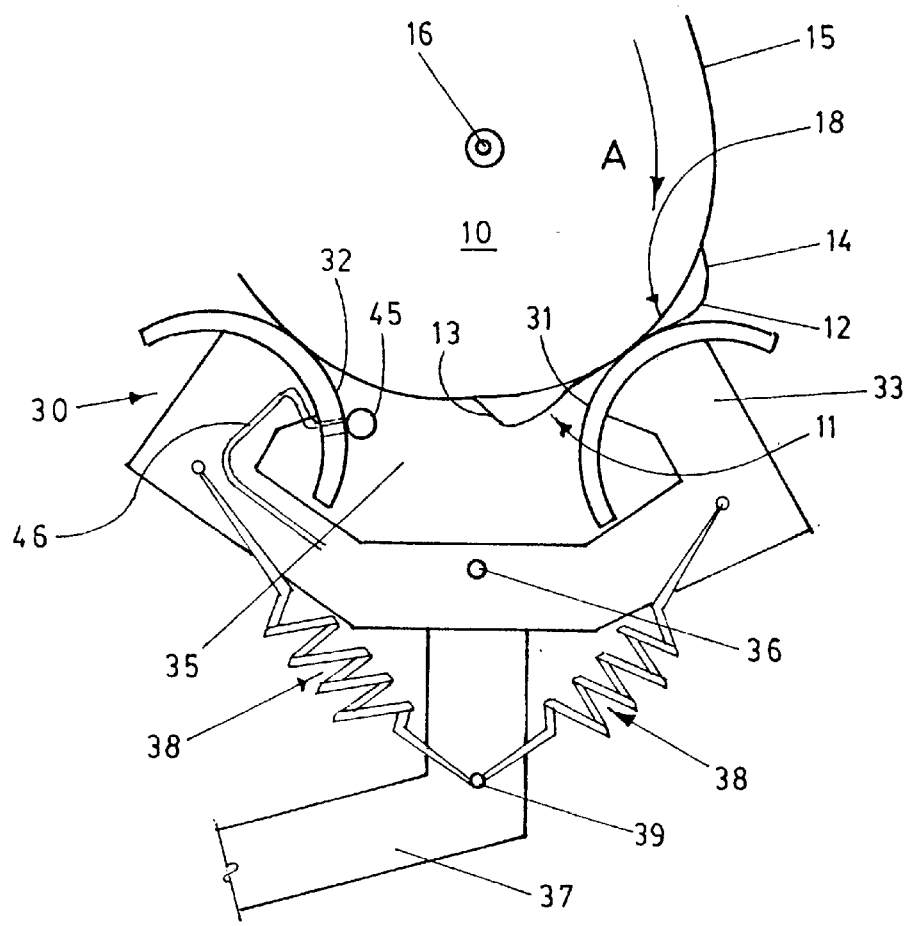
Figure 3:
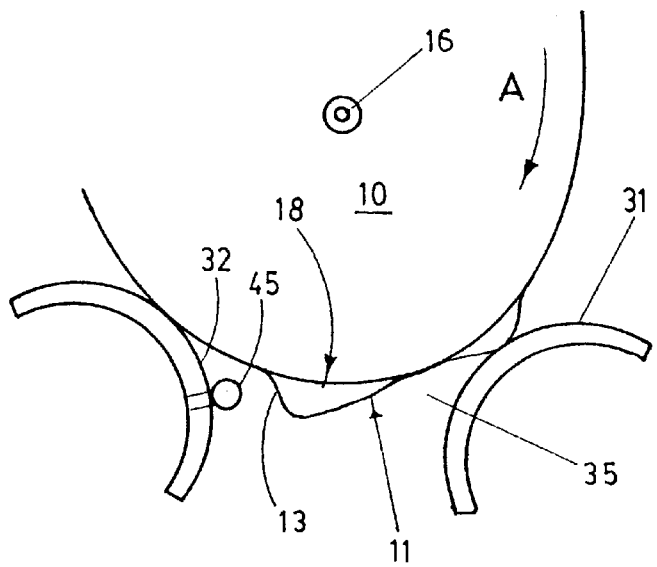
Figure 4:
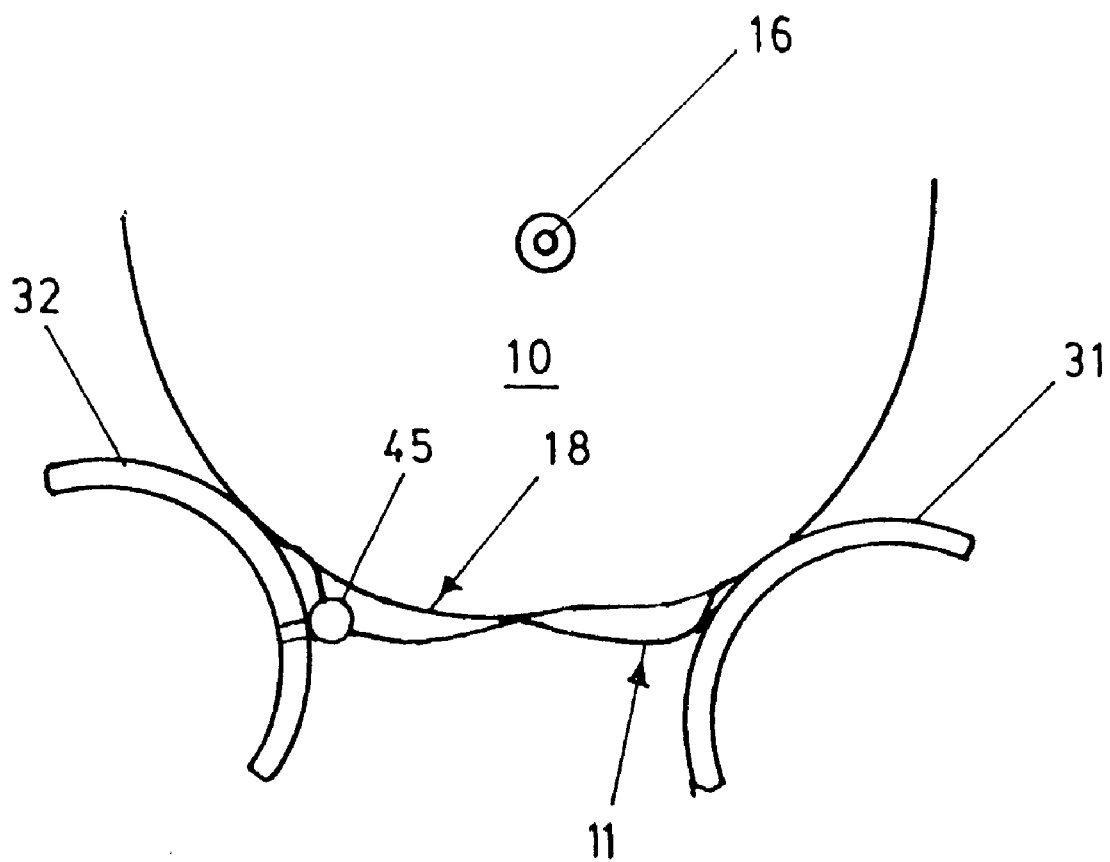

Possible and preferred features of the present invention will now be described with particular reference to the accompanying drawings. However it is to be understood that the features illustrated in and described with reference to the drawings are not to be construed as limiting on the scope of the invention. In the drawings:

FIG. 1 is a schematic simplified view of an apparatus according to a preferred embodiment of the present invention, and FIGS. 2 to 4 show sequential positions of a scallop being rotated into the position where a fit between the shellfish and the shell shape complement is achieved.

The apparatus in FIG. 1 is for processing a scallop 10 which has two shells or valves joined at a hinge region 11 having a generally straight line edge 12 terminating in two steps or shoulders 13, 14 which project outwardly from the continuously curved circumference 15 extending around the remainder of the shellfish. Thus the hinge region 11 is a projecting part 18 which projects out from the periphery and is a distinctive part of the conformation, contour or profile. When the two valves of the shellfish 10 are being drawn apart, e.g. by apparatus described and illustrated in AU-192961/92, the shells or valves will remain attached at the hinge region 11 and the gap or opening through which a cutting blade can be inserted to dislodge the edible adductor muscle will be widest generally opposite the hinge region 11.

The apparatus in FIG. 1 has a chute 20 along which scallops are sequentially fed to the near end 21 where the locating apparatus is positioned. When a scallop 10 reaches the end 21, it can be sensed by any convenient means and the suction head 25 (shown as a suction cup) can be lowered into contact with the shellfish 10 and suction applied to grip and hold the shellfish. The generally upright axis of the shaft 26 on which the suction head 25 is mounted preferably passes through the general centre 16 of the shellfish. This may be achieved by suitable dimensions of the end 21 of the chute 20 and/or by any convenient means for approximately centering the scallop directly beneath the axis of the shaft 26.

After the suction head 25 has engaged and gripped the scallop 10, and if desired lifted the scallop above the end 21 of the chute 20, the shell shape complement 30 (which can be initially in a retracted position outside of the line of the chute 20), can be advanced to the general position shown in FIG. 1. In this position, the complement 30 engages with the circumference 15 of the scallop 10.

The complement 30 includes a pair of curved guides 31, 32 in the form of upright guide plates, the guides 31, 32 being mounted on a mounting yoke 33 so that the guides are spaced apart by a predetermined distance determined empirically for a range of expected scallop shell sizes. The guides 31, 32 define a concavity 35 in the intervening space between the guides into which the hinge region 11 of a scallop 10 fits as shown in FIG. 4. The spacing of the guides 31, 32 and the curvature thereof can enable a range of sizes of scallops to fit at their hinge regions in the concavity 35—smaller shells will fit deeper within the concavity and larger shells will fit in a shallower location.

The guides 31, 32 are mounted to the mounting yoke 33 which in turn is pivotally mounted at point 36 to a mounting arm 37 by which the complement can be advanced and retracted. The complement 30 is mounted for floating or yielding movement for maintaining contact with the scallop 10 as the scallop and complement are moved relative to each other to find the fitting position. For example, the mounting yoke 33 is movable about pivot point 36 and the biasing means 38, shown as springs, operates to maintain the guides 31, 32 in contact with the circumference 15 in spite of changes in the profile of the scallop circumference as the scallop 10 is moved. Preferably the shell centre 16, pivot point 36, and point 39 on the arm 37 where the springs are mounted are all in a straight line so that the contact of the guides 31, 32 with the circumference 15 of the scallop is reliably maintained as a result of the floating movement of the complement 30.

For relatively moving the scallop 10 while contact with the complement 30 is maintained, the apparatus includes moving means 40 illustrated schematically in FIG. 1 as a motor for rotating the shaft 26 in the direction of arrow A. This rotation of the scallop 10 about the general centre 16 of the scallop (as shown in FIGS. 2 to 4) will cause the hinge region 11 to travel around towards the concavity 35 while the circumference 15 maintains contact with the guides 31, 32. When the hinge region 11 is substantially centred between the guides 31, 32, the steps or shoulders 13, 14 will project deeper into the concavity 35 than any other point of the circumference 15 has previously reached. This state or condition of maximum projection of the hinge region 11 into the concavity 35 corresponds to the best fit of the shellfish with the complement 30.

The apparatus includes a sensor 45 for sensing achievement of the fit. The sensor 45 in the illustrated embodiment is operative to sense the presence of the step or shoulder 13 reaching the guide 32. The sensor 45, as shown in the sequence of FIGS. 2 to 4, is not reached by the step 13 until the position of fit shown in FIG. 4 is reached. The sensor 45 can be for example an opto-electrical sensor such as a fibre optic light source and associated light sensor arranged so that when the step 13 reaches the guide 32, the projected point of light from the light source is reflected from the corner of the step 13 back to the light sensor thereby indicating the achievement of the fit. Suitable wiring or fibre optic links 46 carry the light and/or electrical signals to and from the sensor 45. When the fit is achieved as determined by the sensor 45, the rotation of the scallop 10 by the motor 40 can be immediately stopped. At this point, therefore, the scallop will be in a precisely known rotary position ready for further processing, e.g. by the apparatus in AU-19296/92.

For example, the achievement of fit can cause stopping of the motor 40, retraction of the complement 30, elevation of the assembly comprising the suction head 25 and shaft 26 carrying the scallop in the precisely known rotary position, followed by transfer of the scallop automatically to a shell opening station where automatic processing of the scallop and recovery of the edible portion proceeds.

It has been found that the apparatus described and illustrated herein can enable scallops of varying sizes, e.g. having diameters ranging from about 85 mm to as large as 122 mm, to be accurately located using the same complement 30. However, obviously if desired, the complement could be substituted by a differently sized or configured complement for processing different expected size ranges or different kinds of shellfish. It has also been found that the apparatus functions successfully whichever side of the bivalve scallop is presented to the suction head 25. That is, the scallop has one valve which is generally flat and another which is appreciably more convex. The apparatus works successfully to accurately locate and position the hinge region regardless of whether the flat valve or the convex valve is uppermost and is gripped by the suction head 25.

The apparatus described and illustrated herein can be used to feed multiple shell opening and meat recovery machines. For example, two complements can be provided, one at the left side of the end 21 of the chute 20 and one at the right side and these complements are advanced alternately. Thus, a scallop can be located and lifted out of the chute 20 to one side with the position of the hinge region accurately known at a particular position for a shell opening and meat recovery machine located to the left side of the apparatus and the next scallop can be located with the hinge region in a different but known position suitable for further processing by a second machine to the right side of the apparatus.

It will be seen that the particular apparatus described herein and illustrated can enable scallops to be effectively and accurately located in known positions ready for further processing automatically.

What is claimed is:

1. An apparatus for determining the orientation of a bivalve shellfish (10) which is received by the apparatus in an unknown orientation and which is to be subsequently processed to recover an edible portion of the shellfish, the apparatus including a shell shape complement (30) having at least a partially complementary shape to at least a part of the conformation of the shellfish (10), and moving means (40) for relatively moving the shellfish relative to the shell shape complement (30) until a fit of the shellfish (10) with the complement is achieved whereby the orientation of the shellfish relative to the complement can be known.

2. Apparatus as claimed in claim 1 wherein the shell shape complement (30) comprises a means (31, 32, 35) which has a shape complementary to a distinctive part (18) of the contour or profile of the shellfish (10) and which is unlikely to be replicated by another part of the contour or profile of the shellfish even if deformed or damaged.

3. Apparatus as claimed in claim 2 wherein the distinctive part (18) of the contour or profile of the shellfish (10) comprises a projecting part (18) of the contour or profile and wherein the shell shape complement (30) comprises a concavity (35) of generally complementary shape to the projecting part.

4. Apparatus as claimed in claim 3 wherein the shellfish (10) comprises a scallop and the projecting part (18) comprises the binge region (11) of the shell which is defined by two stepped shoulders (13, 14) which step out from the generally continuously curved circumference (15) and which are joined by an approximately straight line segment (12) along which the two valves of the shellfish hinge.

5. Apparatus as claimed in claim 4 wherein the shell shape complement (30) comprises a pair of curved guides (31, 32) spaced apart by a predetermined distance to define the concavity (35) into which the hinge region (11) of the scallop (10) fits.

6. Apparatus as claimed in claim 5 wherein the apparatus further includes a sensor (45) for sensing achievement of the fit of the hinge region (11) of the scallop (10) with the shell shape complement (30) comprised by the pair of curved guides (31, 32), the sensor (45) being located within the concavity (35) between the curved guides at a depth so that the sensor will only be operative to sense the achievement of the fit when the hinge region (11) has fitted between the pair of spaced curved guides (31, 32).

7. Apparatus as claimed in claim 6 wherein the sensor (45) is located closely adjacent to one (32) of the curved guides (31, 32) and is recessed at a predetermined distance into the concavity (35) between the guides so that the sensor (45) will sense the presence of the stepped shoulder (13) area at the corner of the hinge region (11) of the scallop (10) but will not sense the scallop shell when it is in contact with the guides (31, 32) but is not in the fitting position.

8. Apparatus as claimed in claim 1 wherein the apparatus further includes a sensor (45) for sensing achievement of a fit of said at least part of the conformation of the shellfish (10) with the shell shape complement (30) whereby further processing of the shellfish can be initiated in response to sensing of the fit by the sensor (45).

9. Apparatus as claimed in claim 6 wherein the sensor (45) comprises an opto-electrical device operative to optically sense the achievement of the fit and to signal the fit to initiate further processing of the shellfish.

10. Apparatus as claimed in claim 6 wherein the sensor (45) comprises an electro-mechanical device which is operated upon achievement of the fit to initiate further processing of the shellfish.

11. Apparatus as claimed in claim 1 wherein the moving means (40) for moving the shellfish relative to the shell shape complement comprises means for rotating the shellfish (10) relative to the complement (30) until a fit of said at least part of the confirmation of the shellfish (10) with the shell shape complement (30) is achieved.

12. Apparatus as claimed in claim 11 wherein the moving means (40) is operative to rotate the shellfish (10) while the shellfish is maintained in contact with the shell shape complement (30).

13. Apparatus as claimed in claim 12 wherein the shell shape complement (30) and the rotating shellfish (10) are maintained in contact by biasing means (38) operative to bias the shell shape complement (30) against the circumference (15) of the shellfish as the shellfish is rotated by the moving means (40).

14. Apparatus as claimed in claim 13 wherein the shell shape complement (30) is mounted for yielding or floating movement so as to follow the contour of the circumference (15) of the shellfish (10) as the shellfish is rotated and so that when the desired fit of said part of the confirmation of the shellfish with the shell shape complement (30) is being closely approached the shell shape complement (30) is urged into the fitting position.

15. Apparatus as claimed in claim 14 wherein the shellfish (10) comprises a scallop, the apparatus including a suction head (25) which engages with an outer face of one of the valves of the scallop (10) so as to hold the scallop, the drive means (40) being operatively associated with the suction head (25) so as to rotate the scallop generally about the centre of the suction head (25).

16. Apparatus as claimed in claim 15 wherein the suction head (25) is arranged to be engaged with the outer face of one of the valves of the scallop (10) in the approximate centre (16) of the valve so that the scallop is rotated about an axis passing through the centre (16) and at right angles to the general plane of the scallop (10).

* * * * *